United States Patent Office 3,075,987
Patented Jan. 29, 1963

3,075,987
MERCAPTOMETHYL-PYRIDINE DERIVATIVES AND THEIR PRODUCTION
Ulrich Schmidt, Freiburg, Breisgau, Germany, assignor to E. Merck Aktiengesellschaft, Darmstadt, Germany
No Drawing. Filed Sept. 7, 1960, Ser. No. 54,378
Claims priority, application Germany Sept. 24, 1959
4 Claims. (Cl. 260—294.8)

The present invention relates to novel mercaptomethyl-pyridine derivatives and a process for their production.

Mercaptomethyl derivatives of aromatic and heterocyclic compounds were previously only attainable by conversion of the corresponding halomethyl compounds with potassium hydrogen sulfide, sodium hydrogen sulfide, thioacetate, xanthates, thiourea and the like. The halomethyl compounds required are in general obtainable by esterification of the corresponding hydroxy methyl compounds. These methods, however, cannot be used when a certain hydroxyl group is to be selectively converted into a mercapto group in a polyhydroxy aromatic or heterocyclic compound. In such cases it is necessary to block the hydroxyl group or groups which are not to be converted into mercapto groups by rather complicated methods. A direct conversion of one hydroxy methyl group of an aromatic or heterocyclic compound containing other OH groups has previously not been described.

According to the invention it was unexpectedly found that a hydroxy methyl group in a compound of the pyridine or pyrimidine series which is in ortho position to a hydroxy group can be converted in good yields into a mercaptomethyl group by treatment with carbon disulfide under alkaline conditions. The o-mercaptomethyl hydroxy pyridine or pyrimidine compounds can easily be recovered from the reaction medium after neutralization thereof. When vitamin $B_6$ is employed as the starting material 2-methyl-3-hydroxy-4-mercaptomethyl-5-hydroxy methyl pyridine can, for example, be recovered in the form of its acid addition salts.

Expediently the process is carried out by adding sodium hydroxide to the heterocyclic hydroxy methyl compound used as the starting material in the presence of an inert solvent adding carbon disulfide and refluxing the reaction solution for some time under nitrogen.

The resulting reaction mixture can then be neutralized or acidified, for example, with concentrated HCl and the solvent distilled off under reduced pressure and the residue extracted, for instance, with alcohol. By addition of a solvent in which the mercaptomethyl compound produced is insoluble the latter can be precipitated and isolated in crystalline form.

The process according to the invention fundamentally is applicable to all heterocyclic compounds containing a hydroxy methyl group in ortho position to a hydroxyl group. For example, vitamin $B_6$, any desired hydroxy methyl pyridine containing a hydroxyl group in ortho position or the corresponding pyrimidine compounds can be employed as starting materials. Other functional groups, such as, for example, a second hydroxy methyl group or an amino methyl group, do not disturb the process according to the invention.

The mechanism of the reaction involved is not fully understood but probably a cyclic dithiocarbonate is first formed which saponifies with formation of COS and the mercaptomethyl compound which contains a hydroxyl group in ortho position.

The process according to the present invention provides a useful advance in the art as it is thereby for the first time possible to convert a hydroxy methyl group contained in a heterocyclic compound containing other hydroxy groups directly into a mercaptomethyl group without it first being necessary to block the other hydroxy groups by complicated procedures. The process above all is of significance for the production of 4-mercapto-vitamin $B_6$ (2 - methyl-3-hydroxy-4-mercaptomethyl-5-hydroxy methyl-pyridine) which has a good therapeutic action as a tranquilizer.

The following examples will serve to illustrate several embodiments of the invention.

Example 1

A mixture of 50 g. pyridoxine hydrochloride, 50 g. sodium hydroxide, 75 cc. of carbon disulfide and 500 cc. of ethanol was refluxed for 5 hours under nitrogen. The resulting reaction solution was then strongly acidified with concentrated HCl and the solvent distilled off to dryness under reduced pressure. The residue was extracted with 750 cc. of boiling ethanol. After the addition of ether, 35 g. of 2-methyl-3-hydroxy-4-mercaptomethyl-5-hydroxy methyl-pyridine hydrochloride of a melting point of 172° C. crystallized out upon cooling.

Example 2

10 g. of 2-methyl-3-hydroxy-4-hydroxy methyl-5-amino methyl pyridine bishydrochloride, 10 g. of sodium hydroxide and 15 g. of carbon disulfide were refluxed in 100 cc. of ethanol for 6 hours. Thereafter 50 cc. of concentrated HCl were added and the solution boiled for 15 minutes and evaporated to dryness under reduced pressure. The residue was then heated with 300 cc. of acetic acid anhydride and 30 cc. of pyridine for one hour on a water bath and evaporated again to dryness and the residue triturated with 100 cc. of water and allowed to stand for one day. The crude product (6 g.) was then filtered off on a suction filter. Upon recrystallization from ethyl acetate the 2-methyl-3-acetoxy - 4 - acetyl-thiomethyl-5-acetoamino methyl pyridine produced had a melting point of 171° C.

Example 3

60 g. 2-methyl-3-hydroxy-4-hydroxy methyl-5-methyl-pyridine hydrochloride, 60 g. sodium hydroxide, 80 cc. of carbon disulfide and 600 cc. of ethanol were refluxed for 4 hours. Thereafter the reaction solution was strongly acidified with HCl and the mixture evaporated to dryness and the residue extracted with boiling glacial acetic acid. 50 g. of 2-methyl-3-hydroxy-4-mercaptomethyl-5-methyl-pyridine hydrochloride of a melting point of 194° C. were produced.

I claim:

1. A process for the production of mercaptomethyl pyridine derivatives which also carry a hydroxy substituent which consists in reacting a pyridine compound carrying a hydroxy methyl substituent in ortho position to a hydroxyl substituent with carbon disulfide under alkaline conditions and neutralizing the reaction mixture.

2. The process of claim 1 in which said pyridine compound is vitamin $B_6$.

3. A process for the production of mercaptomethyl pyridine derivatives which also carry a hydroxy substituent which consists in reacting a pyridine compound carrying a hydroxy metal substituent in ortho position to a hydroxyl substituent with carbon disulfide in an inert organic solvent in contact with an alkali metal hydroxide and neutralizing the reaction mixture.

4. The process of claim 3 in which said inert organic solvent is ethanol.

References Cited in the file of this patent
UNITED STATES PATENTS
3,010,966    Zima et al. _____ Nov. 28, 1961